US010792872B2

(12) United States Patent
Linde et al.

(10) Patent No.: US 10,792,872 B2
(45) Date of Patent: Oct. 6, 2020

(54) METHOD AND APPARATUS FOR REPAIRING A COMPONENT CONSTRUCTED IN MULTIPLE LAYERS FROM A LAYER COMPOSITE MATERIAL

(71) Applicant: Airbus Operations GmbH, Hamburg (DE)

(72) Inventors: Peter Linde, Hamburg (DE); Norbert Heltsch, Hamburg (DE); Benedikt Kriegesmann, Hamburg (DE); Thorsten Schüppstuhl, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 79 days.

(21) Appl. No.: 16/051,669

(22) Filed: Aug. 1, 2018

(65) Prior Publication Data
US 2019/0039338 A1 Feb. 7, 2019

(30) Foreign Application Priority Data
Aug. 1, 2017 (DE) .................. 10 2017 117 383

(51) Int. Cl.
*B32B 41/00* (2006.01)
*B29C 73/12* (2006.01)
(Continued)

(52) U.S. Cl.
CPC .......... *B29C 73/12* (2013.01); *B23K 26/0006* (2013.01); *B23K 26/354* (2015.10);
(Continued)

(58) Field of Classification Search
CPC ........ B29C 73/12; B29C 73/34; B29C 73/26; B29C 73/10; B29C 2791/009;
(Continued)

(56) References Cited

U.S. PATENT DOCUMENTS

2010/0024958 A1* 2/2010 Sawicki .................. B29C 73/10
156/94
2010/0314029 A1* 12/2010 Lindgren ............... B23Q 17/20
156/98
(Continued)

FOREIGN PATENT DOCUMENTS

DE 4019744 1/1992
DE 102011056088 6/2013
(Continued)

OTHER PUBLICATIONS

German Search Report, dated Dec. 18, 2017, priority document.

*Primary Examiner* — Michael N Orlando
*Assistant Examiner* — Joshel Rivera
(74) *Attorney, Agent, or Firm* — Greer, Burns & Crain, Ltd.

(57) ABSTRACT

A method for repairing a component constructed in multiple layers from a layer composite material comprises a step of removing material of the layer composite material of the component in the region of damage to the component in order to form a scarfed cutout, such that a scarfed peripheral contour formed from a plurality of layers of the component is formed. Furthermore, fiber-reinforced plastic strips, which exhibit a curable plastic material in an uncured state, are applied in layers in the cutout in order to create a replacement-structure semifinished product that is complementary to and butts against the scarfed peripheral contour of the component. In a further step, the curable plastic material contained in the fiber-reinforced plastic strips is cured in order to create a replacement structure and for joining the replacement structure to the component.

20 Claims, 4 Drawing Sheets

(51) Int. Cl.
    *B29C 73/26*     (2006.01)
    *B23K 26/354*     (2014.01)
    *B23K 26/00*     (2014.01)
    *B29C 73/34*     (2006.01)
    *B29C 35/08*     (2006.01)
    *B29C 73/10*     (2006.01)

(52) U.S. Cl.
    CPC .............. *B29C 73/26* (2013.01); *B29C 73/34* (2013.01); *B29C 73/10* (2013.01); *B29C 2035/0838* (2013.01); *B29C 2073/264* (2013.01); *B29C 2791/009* (2013.01)

(58) Field of Classification Search
    CPC ...... B29C 2035/0838; B29C 2073/264; B29C 73/04; B29C 70/54; B23K 26/0006; B23K 26/354
    USPC ........................... 156/64, 350, 351, 378, 379
    See application file for complete search history.

(56) References Cited

U.S. PATENT DOCUMENTS

| | | |
|---|---|---|
| 2015/0158208 A1 | 6/2015 | Williams et al. |
| 2016/0221278 A1 | 8/2016 | Siegfried et al. |
| 2016/0339652 A1 | 11/2016 | Safai et al. |

FOREIGN PATENT DOCUMENTS

| | | |
|---|---|---|
| DE | 102015101328 | 8/2016 |
| DE | 10 2015 110 193 A1 | 12/2016 |
| EP | 3095595 | 11/2016 |
| WO | 2014029969 | 2/2014 |

\* cited by examiner

METHOD AND APPARATUS FOR REPAIRING A COMPONENT CONSTRUCTED IN MULTIPLE LAYERS FROM A LAYER COMPOSITE MATERIAL

CROSS-REFERENCES TO RELATED APPLICATIONS

This application claims the benefit of the German patent application No. 10 2017 117 383.8 filed on Aug. 1, 2017, the entire disclosures of which are incorporated herein by way of reference.

BACKGROUND OF THE INVENTION

The present invention relates to a method for repairing a component constructed in multiple layers from a layer composite material. Furthermore, the present invention relates to an apparatus for carrying out such a method.

In order to repair and join components constructed from layer composite materials, for example structural components of aircraft, various procedures based on riveted, adhesive, and welded joints are known. For example, it is known to fasten a panel-like reinforcement element to the surface of such a component in the region of damage thereto such that said reinforcement element covers the damage. In order to fasten the reinforcement element to the component, in particular riveted, adhesive, and welded joints are provided.

DE 10 2015 110 193 A1 furthermore discloses a method for joining two components constructed from thermoplastic layer composite materials, in which the two components are provided with a mutually complementary peripheral contour by means of material removal and are then joined via the peripheral contour thereof by means of welding.

SUMMARY OF THE INVENTION

The invention is based on an object of providing a method for repairing a component constructed in multiple layers from a layer composite material, which can be carried out easily and in an automated manner even in components with complex shapes. Furthermore, the method is intended to create components which as closely as possible match the shapes and properties of the original, defect-free components. The invention is also based on the object of providing a corresponding apparatus for carrying out the method.

The present invention relates to a method for repairing a component constructed in multiple layers from a layer composite material, which is preferably a structural component of an aircraft. The layers of the component that are constructed from the layer composite material comprise preferably in each case a plastic material in a cured state and reinforcement fibers embedded therein. The plastic material can be a thermoplastic and/or a thermosetting plastic. The reinforcement fibers can be, for example, carbon fibers and/or glass fibers. In a layer of the component, the reinforcement fibers are present preferably in the form of a laid scrim, woven fabric and/or multiaxial laid scrim with a defined fiber orientation. The component to be repaired can have any shape. For example, the component can be provided in the form of a curved, in particular doubly curved panel.

The method comprises a step of removing material of the layer composite material of the component in the region of damage to the component in order to form a scarfed cutout. The removal is preferably carried out such that regions of the component that are arranged in direct contact or in the immediate vicinity of the damage are removed completely or down to a bottommost layer of the component. The damage can in this case be in any form. For example, the damage can be a puncture through the entire thickness of the component. Furthermore, a crack formed within the component or along the surface thereof can form damage. In general, damage can be understood to be any undesired, in particular considerable deviation from an original shape of the component.

The step of removing material of the layer composite material of the component is carried out such that a scarfed peripheral contour formed from a plurality of layers of the component is formed. In particular, the peripheral contour created in such a way forms the cutout in the component. A scarfed peripheral contour is understood in the present case to be a contact face which is provided to join the component by means of a scarfing method. To this end, the peripheral contour preferably has a beveled contact face with an acute angle, i.e., a contact face extending in a shallow manner preferably, the cutout has a shape with a diameter that narrows in a thickness direction of the component.

In a further step of the method, fiber-reinforced plastic strips are applied in layers in the cutout of the component in order to create a replacement-structure semifinished product that is complementary to and butts against the scarfed peripheral contour of the component. The fiber-reinforced plastic strips exhibit a curable plastic material in an uncured state. The fiber-reinforced plastic strips preferably exhibit unidirectional reinforcement fibers and can be applied or laid in different dimensions, in particular in terms of width and thickness, either individually or several at the same time. The fiber-reinforced plastic strips are preferably applied such that the replacement-structure semifinished product formed thereby butts, in the peripheral regions thereof, against surface portions of the peripheral contour and is thus in contact therewith.

Furthermore, the curable plastic material contained in the fiber-reinforced plastic strips, which form the replacement-structure semifinished product, is cured in order to create a replacement structure and to join the replacement structure to the component. In particular, the replacement structure is in this case joined to the component in a materially bonded manner.

In the proposed method, the component is repaired by forming a replacement structure in the region of damage in the component. The step of applying the replacement-structure semifinished product in layers in this case allows direction- and position-dependent laying of the fiber-reinforced plastic strips. In this way, the replacement structure formed by the cured fiber-reinforced plastic strips can be created with a fiber orientation and fiber positioning that is appropriate for the loads applied. As a result, by way of the method, components can be repaired such that they substantially correspond in terms of shape and mechanical properties to the original, defect-free component.

Preferably, in the method, the replacement-structure semifinished product formed by the fiber-reinforced plastic strips are formed such that the replacement structure created by the step of curing corresponds in shape substantially to the original, defect-free form of the component in the region of the cutout. If, as a result of the removal of material of the layer composite material of the component, a hole is created in the component, i.e., a cutout that extends through the entire thickness of the component is created, it can, in particular, be complicated to lay a first layer of the fiber-reinforced plastic strips. In order nevertheless to create a replacement structure corresponding to the form of the original component with reduced effort, a support plane, complementary to the original shape of the component, for receiving a first layer of the fiber-reinforced plastic strips can be provided. The support plane can butt against a surface of the component in the step of applying the fiber-reinforced plastic strips in layers, such that it delimits the cutout from one side.

In the method, the removal of material of the layer composite material is preferably carried out such that a stepped cutout is formed, such that the scarfed peripheral contour is formed as a stepped peripheral contour having a plurality of steps formed by one or more layers of the component. Accordingly, the cutout and the peripheral contour have the same number of steps, in particular at least two. A "stepped form", i.e., a form with a plurality of steps, is understood in the present case to be a structure with a plurality of alternating end faces and surfaces that are arranged in a manner adjoining one another, wherein the plurality of end faces, and the plurality of surfaces have substantially the same orientation in each case. The end portions extend preferably substantially parallel to the thickness direction, or transversely to the extension direction of the layers and the surface portions extend substantially transversely to the thickness direction, or parallel to the extension direction of the layers. The forming of a stepped peripheral contour is particularly advantageous, since in this way, relative to the volume of the replacement structure, a large contact face between the component and the replacement structure and thus high strength can be achieved.

Material of the layer composite material can furthermore be removed such that each of the plurality of steps of the peripheral structure formed is formed by precisely one layer of the component. In other words, for each layer, a step of the peripheral contour is created. As a result, a particularly high number of joining portions can be produced between the replacement structure and the component and thus particularly high strength of the component can be achieved.

Material of the layer composite material is preferably removed by means of a laser beam. In particular, a laser vaporization or laser ablation method can be used here, in which material is removed from a surface of the component by means of pulsed laser radiation with a high-power density. Alternatively, removal can take place by means of milling, grinding and/or water-jet removal.

In a further development, the method can also comprise a step of detecting the damage to the component, in particular by means of an optical method. To this end, it is possible for example for a method for optical distance measurement, for example a laser measurement method, to be used, in which distance measurement is carried out by means of radiation emitted by a laser. Alternatively or additionally, an image processing method can be used, in which images captured for example by a camera are analyzed and thus damage is identified. Furthermore, the method can comprise a step of calculating a position and dimension of the scarfed, in particular stepped cutout to be formed in the component. This can take place in particular on the basis of information obtained in the step of detecting the damage in the component. On the basis of this information, it is possible for example to first of all determine a position of the damage in the component, the dimensions of the damage and the type of damage, for example crack, puncture, etc. Based thereon, the position and dimension of the cutout to be formed can then be calculated. The calculation can be carried out in particular such that a scarfed, in particular stepped peripheral contour to be formed by the cutout ensures a secure joint between the component and replacement structure, i.e., that high strength of the repaired component is ensured, and at the same time the quantity of material to be removed from the layer composite material of the component is minimized. Furthermore, the calculation can be carried out such that a ratio between an area of a joining portion between the peripheral contour and the replacement structure and a quantity or volume of the material to be removed does not drop below a threshold value.

The method can furthermore comprise a step of determining an orientation or a fiber direction of the reinforcement fibers contained in the layer composite material within each of the layers that form the peripheral contour. To this end, exposed surface portions of each layer or of each step can be examined by means of an optical method, for example by means of an image processing method. The step of applying the fiber-reinforced plastic strips in layers in the cutout is in this case carried out preferably in dependence on the information obtained in the step of determining an orientation of the reinforcement fibers contained in the layer composite material.

The application of the fiber-reinforced plastic strips in layers is preferably carried out such that, within each of a plurality of layer planes formed by the plurality of layers of the component, an orientation of reinforcement fibers contained in the fiber-reinforced plastic strips corresponds to an orientation of the reinforcement fibers contained in the layer composite material in each layer of the component forming the layer plane. In other words, as a result, there is the same orientation or fiber direction in each layer plane of the component that is formed by in each case one of the layers of the component and also extends within the replacement structure, both within the layer composite material of the component and in the replacement-structure reinforcement fibers. In this way, the replacement structure formed by the cured fiber-reinforced plastic strips can be created with a fiber orientation and fiber positioning that is appropriate for the loads applied and corresponds to the structure of the layer composite material of the component. The replacement structure can thus be created with mechanical properties that are complementary to the component.

The method can furthermore comprise a step of providing the fiber-reinforced plastic strips. To this end, first of all unsaturated fiber strips can be provided, i.e., fiber strips not provided with plastic material. The fiber strips can be unidirectional fibers in strip form or fibers provided as a fiber bundle. This can take place by means of a continuous method, in which the fiber strips are unwound from a reel. Then, they can be saturated with a curable plastic material in an uncured state and then be cut to length. The fiber strips are saturated preferably with heat being applied, in order to increase the viscosity of the plastic material. Alternatively, a reinforced plastic-strip semifinished product, which comprises reinforcement fibers embedded in the plastic material, can be used, said plastic-strip semifinished product being able to be unwound from a reel in a continuous method and then cut to length. The curable plastic material of the fiber-reinforced plastic strips can in this case exhibit a thermosetting and/or thermoplastic material.

The fiber-reinforced plastic strips can be applied in layers by means of an automated tape laying (ATL) method, in which the fiber-reinforced plastic strips are applied in the cutout in the form of tapes or tows. Alternatively or additionally, the fiber-reinforced plastic strips can be applied by means of an automated fiber placement (AFP) method, in which the fiber-reinforced plastic strips are applied in the form of fiber bundles, which have a much smaller thickness or width than the fiber-reinforced plastic strips that are used in the ATL method. This makes it possible to apply fiber structures with a high fiber deflection, as is the case for example in complex, highly curved replacement structures. Compared with the ATL method, however, the application rate or speed is lower.

As a result, the proposed method allows the production of complex replacement structures, appropriate for the loads applied, within a component to be repaired, this being able to be carried out with reduced effort and in a fully automated manner.

An apparatus for repairing a component constructed in multiple layers from a layer composite material comprises a removal unit which, in order to form a scarfed cutout in the region of damage to the component, removes material of the layer composite material of the component such that a scarfed peripheral contour formed by a plurality of layers of the component is formed. The apparatus also comprises a placement head, which, in order to create a replacement structure complementary to and joined to the scarfed peripheral contour of the component, is designed to apply fiber-reinforced plastic strips, which exhibit a curable plastic material in an uncured state, in layers in the cutout of the component.

The apparatus is preferably a mobile apparatus, which allows on-site repair in particular of large components. This is advantageous in particular when a quick repair is intended to take place, or it is uneconomical to transport the component on account of the size thereof.

The removal unit is preferably designed to remove material of the layer composite material of the component such that a stepped cutout is formed, such that the scarfed peripheral contour is formed as a stepped peripheral contour having a plurality of steps formed by one or more layers of the component.

The removal unit can comprise a laser-beam source, which creates a laser beam for removing material of the layer composite material of the component, and an optical unit for beam guidance of the laser beam produced by the laser-beam source.

The apparatus can furthermore comprise a sensor unit, in particular a laser measurement device and/or image acquisition unit, for recording a surface of the component to be repaired and for sending information obtained in this way to a control unit, connected thereto, of the apparatus. The control unit is preferably designed to detect damage in the component on the basis of the information obtained from the sensor unit, to calculate a position and dimension of the cutout to be formed in the component and/or, based thereon, to control the removal unit to form the cutout.

The control unit can furthermore be designed to determine, on the basis of the information obtained from the sensor unit, an orientation of reinforcement fibers, contained in the layer composite material, within each layer of the component that forms the peripheral contour. Furthermore, the control unit can be designed to control the placement head in dependence on the determined orientation of the reinforcement fibers, contained in the layer composite material, of the component such that the fiber-reinforced plastic strips are applied in the cutout of the component in each case with a desired orientation of the reinforcement fibers relative to the component.

The placement head of the apparatus can furthermore comprise a reel for providing a fiber strip and/or a fiber-reinforced plastic-strip semifinished product. In the event that the placement head comprises the reel for providing a fiber strip, said placement head can furthermore have a dispenser for providing a curable plastic material, which is designed to saturate the fiber strip unwound from the reel with the curable plastic material, such that a fiber-reinforced plastic-strip semifinished product is created. The placement head can furthermore comprise a severing apparatus for cutting the fiber-reinforced plastic-strip semifinished product to length, and/or a heating apparatus for heating the fiber-reinforced plastic-strip semifinished product and/or the fiber-reinforced plastic strips that are to be applied and/or have been applied.

BRIEF DESCRIPTION OF THE DRAWINGS

Preferred exemplary embodiments of the invention are explained in more detail in the following text with reference to the appended schematic drawings, in which.

DETAILED DESCRIPTION OF THE PREFERRED EMBODIMENTS

Figure 1:
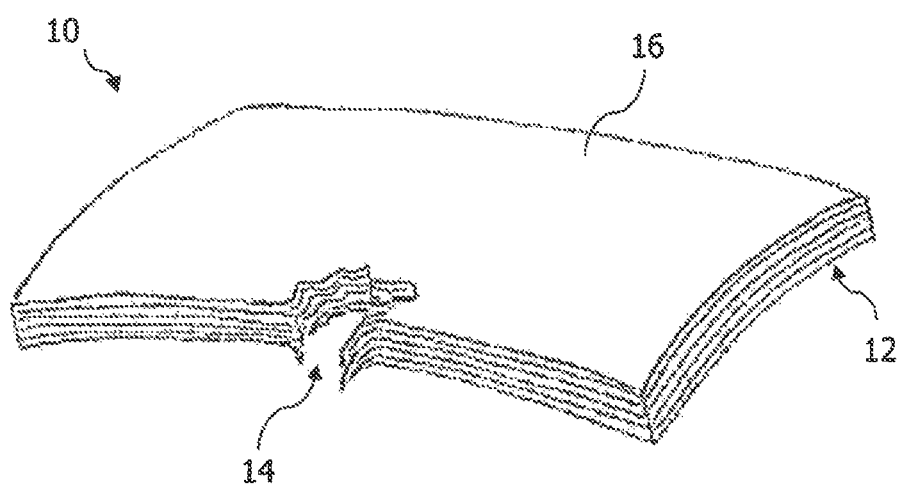
FIGS. 1 to 3 show a method for repairing a component constructed in multiple layers from a layer composite material.
Figure 2:
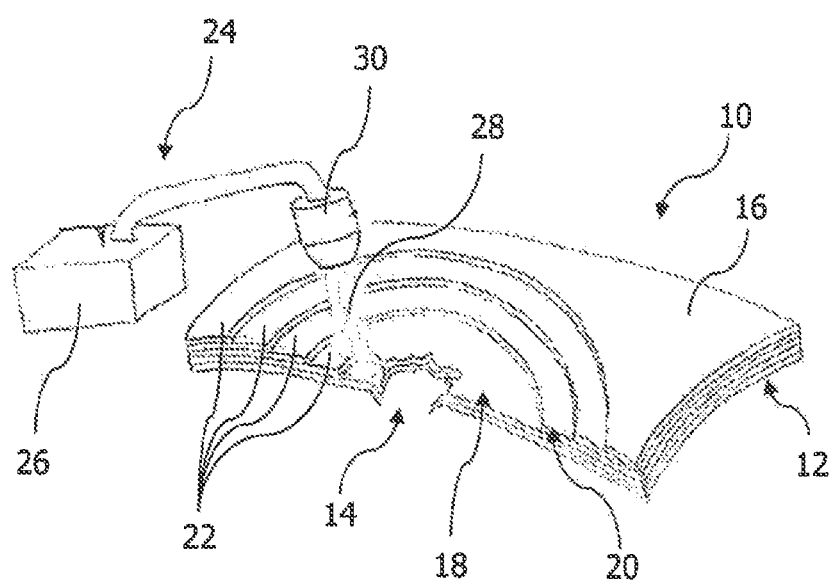

FIG. 1 shows a component 10, which is preferably a structural component of an aircraft. The component 10 is constructed in multiple layers 12 from a layer composite material and has a curved shape. In a peripheral region, the component 10 has damage 14 in the form of a puncture through the entire thickness of the component 10. In a first step of a method for repairing a component constructed in multiple layers from a layer composite material, the damage 14 in the component 10 is detected by means of an optical method, in particular by means of a laser measurement method and/or image processing method. To this end, a surface 16 of the component 10 is scanned by means of a sensor. Based thereon, a position and dimension of a scarfed, in particular, stepped cutout 18 to be formed in the component 10, as shown in FIG. 2, is calculated. This is carried out on the basis of information obtained in the step for detecting the damage 14 in the component 10.

In a next step, material of the layer composite material of the component 10 is removed in the region of the damage 14 to the component 10 in order to form the stepped cutout 18, such that a scarfed, in particular, stepped peripheral contour 20 having a plurality of steps 22 formed by one or more layers 12 of the component 10 is formed. The removal is carried out such that regions of the component 10 that are arranged in the immediate vicinity of the damage 14 are removed down to a bottommost layer 12 of the component. In particular, the removal step is carried out such that each of the plurality of steps 22 of the peripheral structure 20 formed is formed by precisely one layer 12 of the component 10.

In the present case, the removal of material of the layer composite material is carried out by means of a removal unit 24. The removal unit 24 comprises a laser-beam source 26 for producing a laser beam 28 that removes the material of the layer composite material, and an optical unit 30 for beam guidance of the laser beam 28. The removal is carried out in this case in particular by means of a laser vaporization or laser ablation method, in which the material is removed from the surface 16 of the component 10 by means of pulsed laser radiation with a high-power density.

In the present case, the component 10 comprises layers 12 constructed from unidirectional laid scrims. In other words, within each layer 12 of the component 10, the layer composite material comprises reinforcement fibers, which are oriented in the same fiber direction. In a further step of the method, an orientation or fiber direction of the reinforcement fibers contained in the layer composite material is determined within each of the layers 12 forming the peripheral contour 20. To this end, exposed surface portions of the peripheral contour 20, which extend parallel to the extension direction or transversely to the thickness direction of the layers 12, are recorded by means of an optical method, in particular, with the aid of the sensor, and analyzed.

Figure 3:
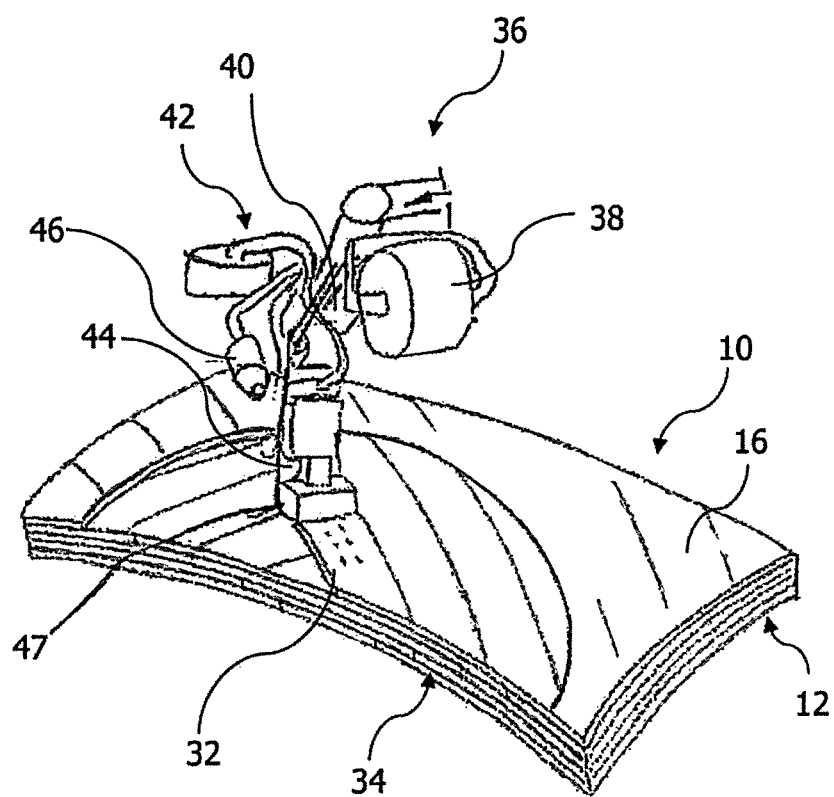

As shown in FIG. 3, a step of applying fiber-reinforced plastic strips 32 in layers in the cutout 18 then takes place in order to create a replacement-structure semifinished product 34 that is complementary to and butts against the stepped peripheral contour 20 of the component 10. The fiber-reinforced plastic strips 32 exhibit a curable plastic material in an uncured state, which is preferably a thermosetting and/or thermoplastic material. Furthermore, the fiber-reinforced plastic strips 32 comprise unidirectional reinforcement fibers. The step of applying the fiber-reinforced plastic strips 32 in layers in the cutout 18 takes place in dependence on the information obtained in the step of determining an orientation of the reinforcement fibers contained in the layer composite material. Accordingly, the fiber-reinforced plastic strips 32 are applied such that, within each of a plurality of layer planes formed by the plurality of layers 12 of the component 10, an orientation of reinforcement fibers contained in the fiber-reinforced plastic strips 32 corresponds to an orientation of the reinforcement fibers, contained in the layer composite material, in each layer 12 that forms the layer plane. In other words, in each layer plane of the component 10 that is formed by, in each case, one of the layers 12 of the component 10 and also extends within the replacement-structure semifinished product 34, reinforcement fibers with the same orientation or fiber direction are present both within the layer composite material of the component 10 and within the replacement-structure semifinished product 34. In this way, a replacement-structure semifinished product 34 having a fiber orientation and positioning that is appropriate for the loads applied is created.

Finally, the curable plastic material that is contained in the fiber-reinforced plastic strips 32 which form the replacement-structure semifinished product 34 is cured in order to create a replacement structure and to join the replacement structure to the component 10. As a result, the replacement structure is joined to the component 10 in a materially bonded manner. In the present method, the replacement-structure semifinished product 34 formed by the fiber-reinforced plastic strips 32 is formed such that the replacement structure created by the curing step corresponds in shape substantially to the original, defect-free form of the component 10 in the region of the cutout 18.

The step of applying the fiber-reinforced plastic strips 32 in layers is carried out in the present case by means of a placement head 36, which, in order to create the replacement structure that is complementary to and joined to the stepped peripheral contour 20 of the component 10, is designed to apply the fiber-reinforced plastic strips 32 in layers in the cutout 18 in the component 10. The placement head 36 comprises a reel 38 for providing a fiber strip 40. A dispenser 42 of the placement head 36 for providing a curable plastic material is designed to saturate fiber strip 40 unwound from the reel 38 with the curable plastic material such that a fiber-reinforced plastic-strip semifinished product 44 is created. Furthermore, the placement head 36 comprises a severing apparatus (not shown here) for cutting the fiber-reinforced plastic-strip semifinished product 44 to length, with the result that the fiber-reinforced plastic strips 32 are created. The placement head 36 moreover comprises a heating apparatus in the form of a laser-light source 46 for heating the fiber-reinforced plastic-strip semifinished product 44 and/or the fiber-reinforced plastic strips 32 that are to be applied and/or have been applied. A heated stamping unit 47 of the placement head 36 serves to compact the fiber-reinforced plastic strips 32 during the laying thereof. Alternatively, the placement head 36 can be equipped with a reel for providing a fiber-reinforced plastic-material semifinished product, wherein fiber-reinforced plastic-material semifinished product formed by saturated fiber strips is wound up on the reel. The placement head 36 can be provided in the form of an ATL placement head or of an AFP placement head.

Figure 4:
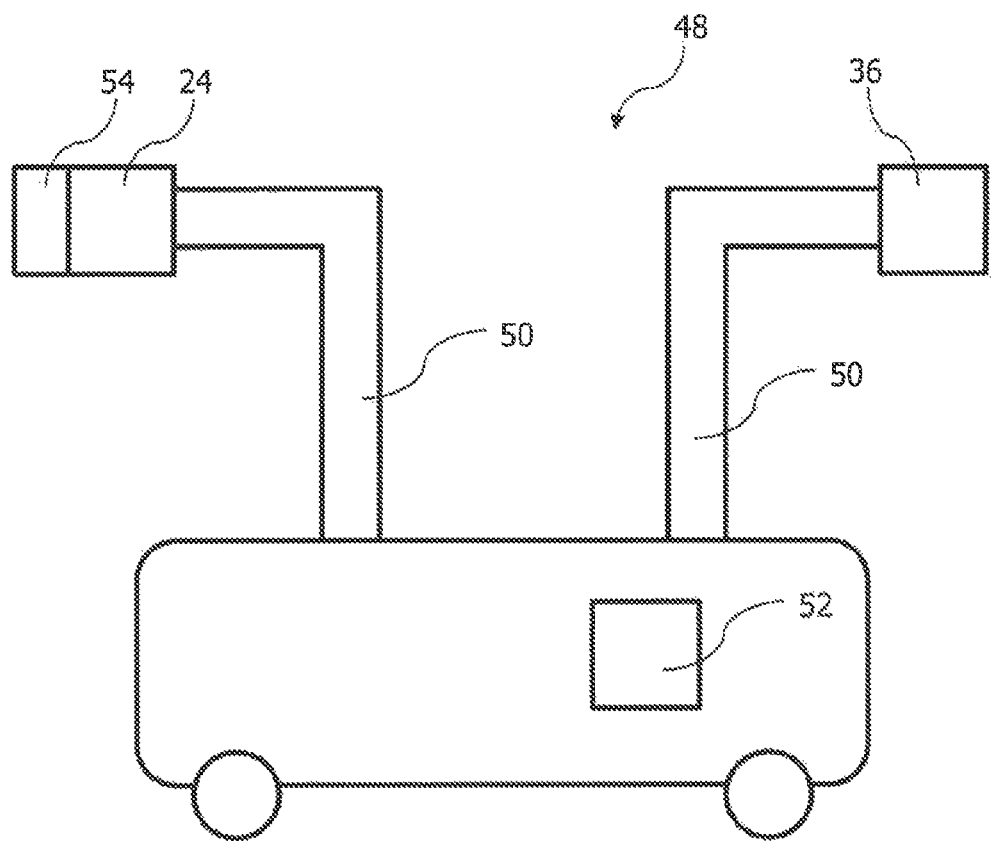
FIG. 4 shows an apparatus for carrying out the method shown in FIGS. 1 to 3.

FIG. 4 shows a mobile apparatus 48 for repairing a component constructed in multiple layers from a layer composite material, with which the above-described method is able to be carried out in an automated manner. The apparatus 48 comprises the removal unit 24 and the placement head 36, which are each mounted on a multiaxial robot arm 50. Furthermore, the apparatus 48 has a control unit 52, which controls the multiaxial robot arm 50, the removal unit 24 and the placement head 36.

Furthermore, the apparatus 48 comprises a sensor unit 54 fastened to the removal unit 24, in particular, comprising a laser measurement device and/or an image acquisition unit, for recording the surface 16 of the component 10 to be repaired and for sending the information obtained in this way to the control unit 52 connected thereto. The control unit 52 is designed to detect the damage 14 in the component 10 on the basis of the information obtained from the sensor unit 54, to calculate a position and dimension of the stepped cutout 18 to be formed in the component 10, and/or, based thereon, to control the removal unit 24 to form the cutout 18. The control unit 52 is furthermore designed to determine, on the basis of the information obtained from the sensor unit 54, an orientation of reinforcement fibers contained in the layer composite material within each of the layers 12 of the component 10 that form the steps 22 of the peripheral contour 20. The control unit 52 controls the placement head 36 in dependence on the orientation, determined in this way, of the reinforcement fibers such that the fiber-reinforced plastic strips 32 are applied in the cutout 18 in the component 10 in each case with a desired orientation of the reinforcement fibers relative to the component 10.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for repairing a component constructed in multiple layers from a layer composite material, which comprises the steps of:

removing material of the layer composite material of the component in a region of damage to the component to form a scarfed cutout, such that a scarfed peripheral contour is formed from a plurality of layers of the component, wherein the step of removing material of the layer composite material of the component is carried out using a laser beam;

applying fiber-reinforced plastic strips, which exhibit a curable plastic material in an uncured state, in layers in the scarfed cutout to create a replacement-structure semifinished product that is complementary to and butts against the scarfed peripheral contour of the component; and curing the curable plastic material contained in the fiber-reinforced plastic strips to create a replacement structure and to join the replacement structure to the component.

2. The method according to claim 1, wherein the replacement structure corresponds in shape substantially to an original, defect-free form of the component in the region of the scarfed cutout.

3. The method according to claim 1, wherein the step of removing material of the layer composite material of the component is carried out such that a stepped cutout is formed, such that the scarfed peripheral contour is formed as a stepped peripheral contour having a plurality of steps formed by one or more layers of the component.

4. The method according to claim 3, wherein the step of removing material of the layer composite material of the component is carried out such that each of the plurality of steps of the peripheral contour formed is formed by precisely one layer of the component.

5. The method according to claim 1, wherein the step of removing material of the layer composite material of the component is carried out by a removal unit mounted on a mobile apparatus, the removal unit comprising a laser beam source and an optical unit.

6. The method according to claim 5, wherein the step of removing material of the layer composite material of the component is carried out by laser vaporization.

7. The method according to claim 1, which furthermore comprises the steps of:
  detecting the damage in the component by means of an optical method, and
  calculating a position and dimension of the scarfed cutout to be formed in the component based on information obtained in the step of detecting the damage in the component.

8. The method according to claim 7, wherein the optical method comprises a laser measurement method.

9. The method according to claim 7, wherein the optical method comprises an image processing method.

10. The method according to claim 1, which furthermore comprises a step of determining an orientation of reinforcement fibers contained in the layer composite material within each of the layers of the component that form the scarfed peripheral contour, wherein the step of applying the fiber-reinforced plastic strips in layers is carried out in dependence on information obtained in the step of determining an orientation of the reinforcement fibers.

11. The method according to claim 10, wherein the step of determining an orientation of reinforcement fibers contained in the layer composite material comprises examining exposed surface portions of the layers by means of an optical method.

12. The method according to claim 1, wherein the step of applying the fiber-reinforced plastic strips in layers is carried out such that, within each of a plurality of layer planes formed by the plurality of layers of the component, an orientation of reinforcement fibers contained in the fiber-reinforced plastic strips corresponds to an orientation of the reinforcement fibers contained in the layer composite material in each layer forming the layer plane.

13. The method according to claim 1, wherein the curable plastic material of the fiber-reinforced plastic strips comprises at least one of a thermosetting or thermoplastic material.

14. A mobile apparatus for repairing a component constructed in multiple layers from a layer composite material, said mobile apparatus comprising:
  a removal unit which, in order to form a scarfed cutout in a region of damage to the component, is configured to remove material of the layer composite material of the component such that a scarfed peripheral contour formed by a plurality of layers of the component is formed, and
  a placement head, which, in order to create a replacement structure complementary to and joined to the scarfed peripheral contour of the component, is configured to apply fiber-reinforced plastic strips, which exhibit a curable plastic material in an uncured state, in layers in the scarfed cutout of the component.

15. The mobile apparatus according to claim 14, wherein the removal unit is configured to remove material of the layer composite material of the component such that a stepped cutout is formed, such that the scarfed peripheral contour is formed as a stepped peripheral contour having a plurality of steps formed by one or more layers of the component, and wherein the removal unit is mounted to a multiaxial robot arm of the mobile apparatus.

16. The mobile apparatus according to claim 14, wherein the removal unit comprises a laser-beam source, configured to create a laser beam for removing material of the layer composite material of the component, and an optical unit configured to guide the laser beam.

17. The mobile apparatus according to claim 14, furthermore comprising a sensor unit for recording a surface of the component to be repaired and for sending information obtained in this way to a control unit, connected thereto, of the apparatus, which is designed to detect damage in the component based on information obtained from the sensor unit, to calculate a position and dimension of the cutout which is to be at least one of formed in the component or based thereon, to control the removal unit to form the cutout.

18. The mobile apparatus according to claim 17, wherein the sensor unit comprises one of a laser measurement device and an image acquisition unit.

19. The mobile apparatus according to claim 17, wherein the control unit is furthermore configured to determine, based on information obtained from the sensor unit, an orientation of reinforcement fibers contained in the layer composite material, within each of the layers of the component that form the scarfed peripheral contour, and to control the placement head in dependence on a determined orientation of the reinforcement fibers such that the fiber-reinforced plastic strips are applied in the cutout of the component in each case with a desired orientation of the reinforcement fibers relative to the component.

20. The mobile apparatus according to claim 14, wherein the placement head furthermore comprises at least one of:
  a reel for providing at least one of a fiber strip or a fiber-reinforced plastic-strip semifinished product,
  a dispenser for providing a curable plastic material, which is configured to saturate the fiber strip unwound from the reel with the curable plastic material, such that a fiber-reinforced plastic-strip semifinished product is created, a severing apparatus for cutting the fiber-reinforced plastic-strip semifinished product to length, or a heating apparatus for heating at least one of the fiber-reinforced plastic-strip semifinished product or the fiber-reinforced plastic strips that are at least one of to be applied or have been applied, and wherein the placement head is mounted to a multiaxial robot arm of the mobile apparatus.

* * * * *